(No Model.) 3 Sheets—Sheet 2.
C. KIDDER.
MACHINE FOR MEASURING AND REGISTERING THE MEASUREMENT OF LUMBER.
No. 485,946. Patented Nov. 8, 1892.
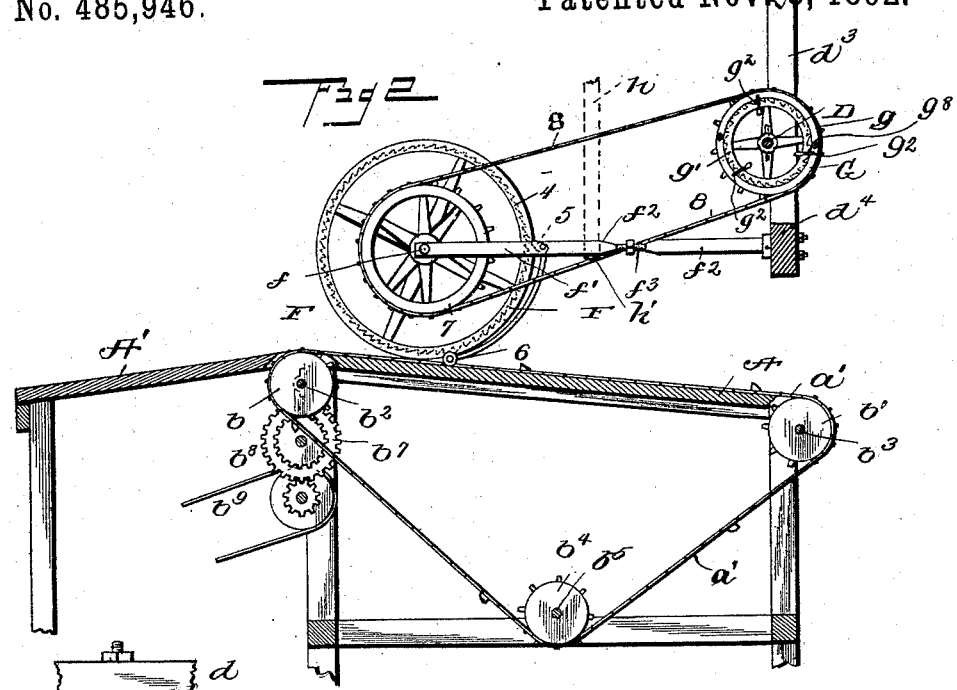
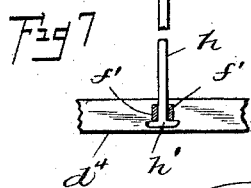
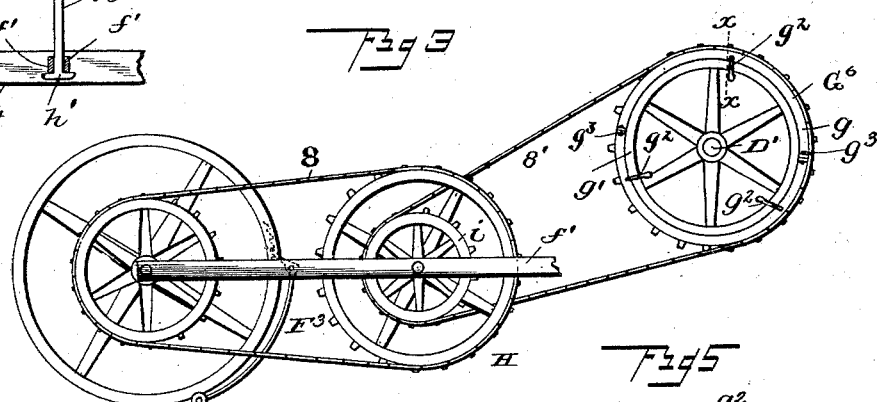
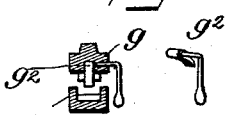
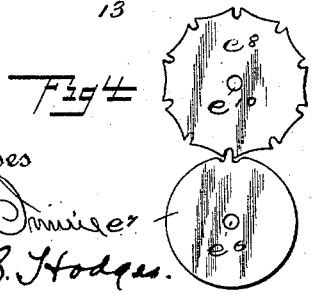
Witnesses Inventor

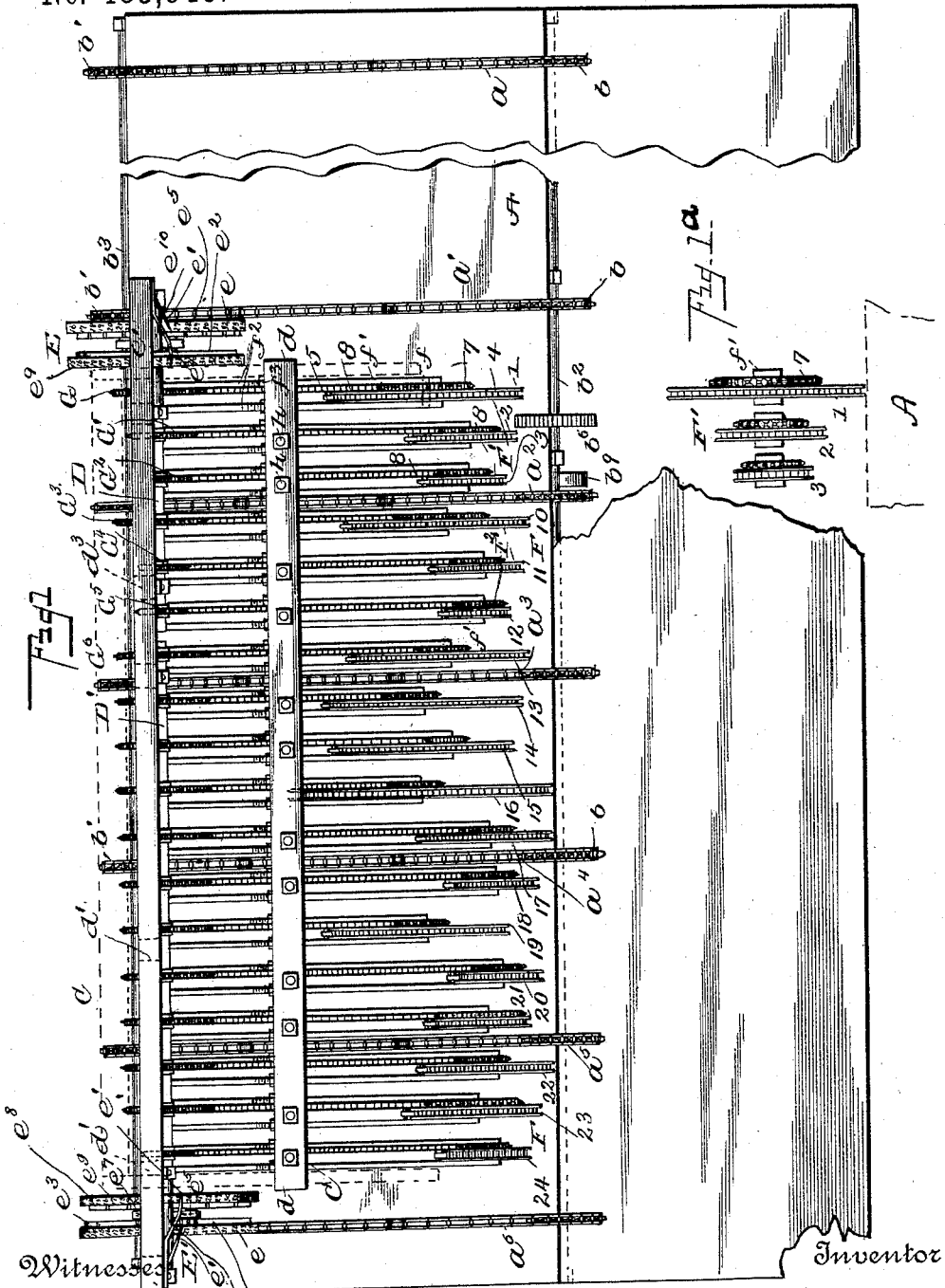

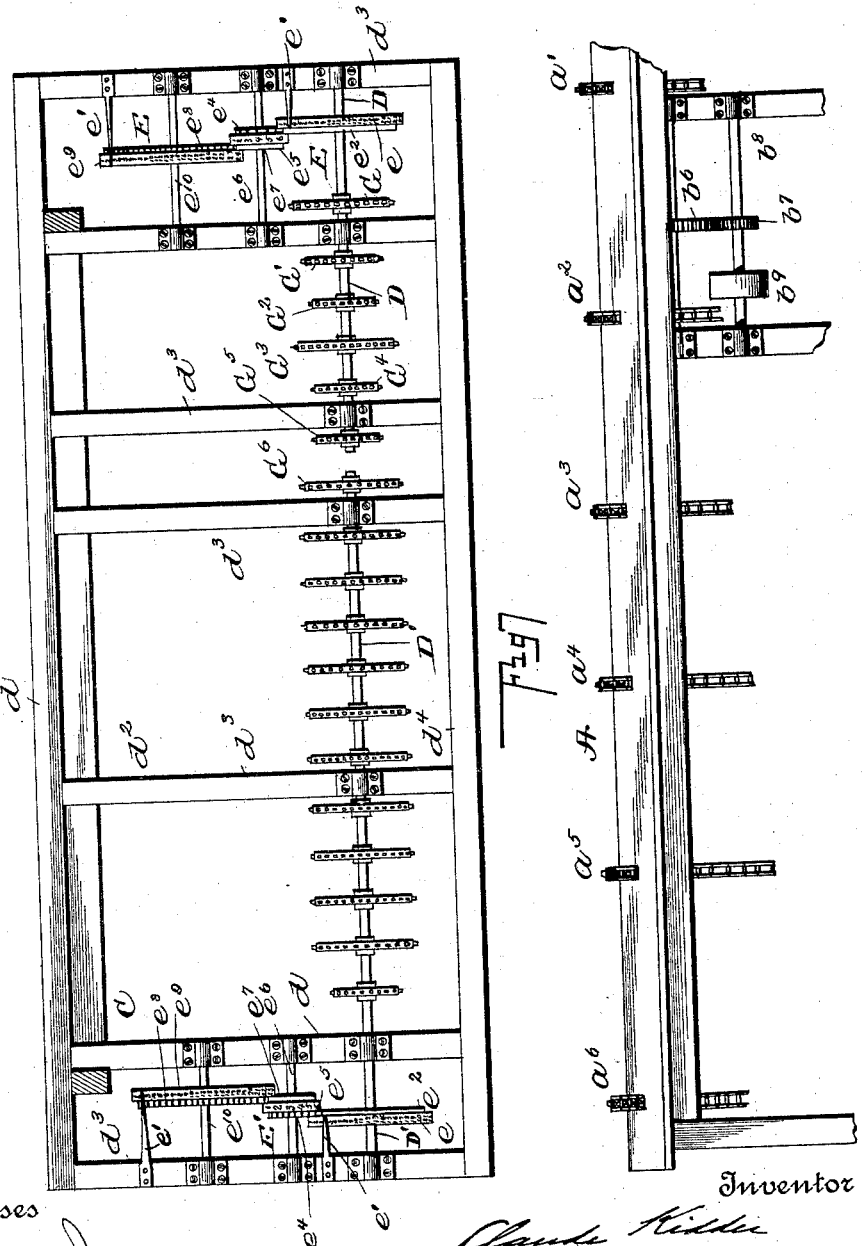

UNITED STATES PATENT OFFICE.

CLAUDE KIDDER, OF CARLTON, MINNESOTA.

MACHINE FOR MEASURING AND REGISTERING THE MEASUREMENT OF LUMBER.

SPECIFICATION forming part of Letters Patent No. 485,946, dated November 8, 1892.

Application filed January 23, 1892. Serial No. 419,039. (No model.)

*To all whom it may concern:*

Be it known that I, CLAUDE KIDDER, of Carlton, in the county of Carlton and State of Minnesota, have invented certain new and useful Improvements in Machines for Measuring and Registering Lumber; and I do hereby declare the following to be a full, clear, and exact description of the invention, such as will enable others skilled in the art to which it appertains to make and use the same.

This invention relates to a lumber measuring and registering machine, and has for its object the production of a new and improved machine of this nature in which the boards to be measured can be inserted into the machine sidewise and the number of square feet contained in each board registered.

The invention comprises a series of measuring-wheels adjusted to the different lengths and thicknesses of the boards and which are operated by the boards passing thereunder and registers operated by a shaft or shafts connected with said sets of wheels, whereby the registers will indicate the number of square feet contained in the boards.

The invention also comprises the detail construction, combination, and arrangement of parts, substantially as hereinafter fully set forth, and particularly pointed out in the claims.

In the accompanying drawings, Figure 1 is a plan view of my improved lumber-measurer. Fig. 1$^a$ is a view showing the positions of the wheels of one gang relative to the table. Fig. 2 is a vertical sectional view thereof, showing but one measuring-wheel and its adjuncts. Fig. 3 is a detail view showing one set of the series of wheels. Fig. 4 is a view of the engaging wheels of the registers. Fig. 5 is a transverse sectional view on the line $x$ $x$, Fig. 3. Fig. 6 is a view in elevation of the frame having the registering mechanism and a portion of the table, the measuring-wheels being removed. Fig. 7 is a detail showing one of the depending supporting-rods.

Referring to the drawings, A designates the table or bench, the top of which is inclined, and it has an inclined discharge A' at one side extending longitudinally therewith. This table is about twenty feet in length. (Inasmuch as this is a measuring-machine and the working of the parts is dependent upon the relative dimensions thereof, all lengths, &c., herein set forth will be based upon a table of the length stated and capable of measuring the length and thickness of boards extending, as regards length, from two to twenty feet and from one to three inches in thickness.) Over this table at one end is passed an endless chain belt $a$, and at about ten feet therefrom is a second belt $a'$, and about two feet from the latter is a third belt $a^2$. The belts $a^3$ $a^4$ $a^5$ $a^6$ follow to the end of the table, the same space being observed between each belt. These belts are passed around sprocket-wheels $b$ $b'$ on parallel shafts $b^2$ $b^3$, held by boxing attached to the sides of table A, and they are also passed beneath lazy wheels or pulleys $b^4$ on the longitudinal shaft $b^5$, extending lengthwise of the table at the bottom of the framework thereof. The construction and arrangement above outlined are shown in Figs. 1, 2, and 6. The lumber is fed forward sidewise by these endless belts. Upon the shaft $b^2$ is a gear-wheel $b^6$, which engages a gear-wheel $b^7$ of driving-shaft $b^8$, to which power is applied by a main driving-belt (not shown) passed around a pulley $b^9$, said belt leading from an engine or other suitable source of power. (Not shown.)

C is a frame (shown in dotted lines, Fig. 1, and full lines, Fig. 6) to which are secured two longitudinal joists or beams $d$ $d'$, Figs. 1 and 6. From the latter extends a frame $d^2$, composed of parallel vertical bars $d^3$ and a lower horizontal bar $d^4$. To the vertical bars $d^3$ are secured by boxes two disconnected shafts D D', upon the outer ends of which shafts are the main wheels $e$ of the registers E E'. Hereinafter these shafts D D' will be referred to as the "register-shafts," since it is through their revolution that motion is imparted to the registers. Since each register is a counterpart of the other, one only need be described. Upon the periphery of wheel $e$ are numerals extending from "1" to "100," and over the numerals extend a finger or pointer $e'$, attached to one of the bars $d^3$. To the side of wheel $e$ is attached a circular plate $e^2$, having a tooth $e^3$ (see Fig. 4) projecting therefrom, designed to engage at each complete revolution of the wheel $e$ with a grooved wheel $e^4$, secured to one side of a second register-wheel $e^5$, fast on a shaft $e^6$, supported by boxes fastened to bars $d^3$. Upon the periphery of this wheel are numerals extending from "1" to "10," and to the other side of wheel $e^5$ is a plate $e^7$, similar to plate $e^2$, designed upon each revolution of wheels $e^5$ to engage and turn a grooved wheel $e^8$, similar to wheel $e^4$, attached to a third register-wheel $e^9$ on a shaft $e^{10}$. On the periphery of this third register-wheel $e^9$ are numerals extending from "1" to "100." A finger or pointer similar to $e'$ is employed for each register-wheel.

Located on or above table A, from the endless belt $a'$ to the endless belt $a^6$, are the measuring-wheels F. These measuring-wheels are of three kinds—that is, designed to measure and register (through the agency of mechanism to be described) the thickness of boards from one to three inches. Hence they are divided off into six "gangs," so to speak, each gang being composed of three wheels. The first gang F' embraces a main wheel 1, which rests upon the table A, a wheel 2, which is two inches above the table, and a wheel 3, which is three inches above said table. The axle $f$ of wheel 1 is supported by parallel arms $f'$, pivotally connected to the horizontal bar $d^4$ of frame $d^2$. Each of these arms is preferably composed of two members $f^2$, united together by a threaded rod-and-nut connection $f^3$. In the periphery of wheel 1, between the protruding sides thereof, are teeth or notches 4, with which engage the upper end of a pawl 5, fulcrumed between the arms $f'$ and curved downwardly and to one side of said wheel. The lower end of this pawl is provided with a weight 6, or it may be a small roller. This pawl, is so arranged that when its weighted end is lifted it will allow wheel 1 to freely revolve as a board passes thereunder; but as soon as the weight 6 falls to its normal position the revolution of said wheel is immediately stopped by the pawl 5. Upon the axle $f$ of the wheel 1 is a sprocket-wheel 7, around which is passed a chain 8, which also encompasses a sprocket-wheel G on the register-shaft D. This sprocket-wheel G is composed of two independent main parts—the outer section $g$ and the inner section $g'$. The inner section $g'$ is provided with grooves or notches in its periphery, and with these grooves or notches is designed to engage any one of a series of three weighted pawls $g^2$, fulcrumed on the outer rim or section. Thus the inner section is free to revolve independent of and in advance of the other section; but the latter cannot move without revolving the inner section. The outer section $g$ is made in two parts and has its ends united by bolts $g^3$, passed through flanges of said ends. Speaking of the wheel 1 alone, it will be seen that a board passing thereunder upon coming in contact therewith, will effect the elevation of the weighted pawl and cause said wheel to revolve. The revolution of this wheel will impart motion to wheel G, effecting the turning of the register-shaft D and the first one $e$ of the series of wheels composing the register, thus registering the length and thickness of such board.

The construction and arrangement of wheel 2 is substantially the same as wheel 1, save that it is of lesser diameter. This wheel is held two inches above the surface of the table A by means of a vertical rod $h$, depending from the beam $d$ of the frame C and having lower lateral arms $h'$ supporting the parallel arms $f'$, which rest on said lateral arms. The sprocket-chain 8, operated by this wheel, encompasses a sprocket-wheel G' on the shaft D the counterpart of the sprocket-wheel G, save as to dimensions. The wheel 3 is the same in construction and arrangement as the wheels 1 and 2, save that it is of smaller diameter, and is supported three inches above the table A by a depending rod $h$, similar to the support for the wheel 2. Its sprocket-chain 8 encompasses a sprocket-wheel $G^2$ on the shaft D.

The next gang of wheels $F^2$ embraces the wheel 10, resting on table A, and wheels 11 and 12, which latter are respectively suspended two and three inches above said table in a manner similar to the corresponding wheels of the first gang F'. The sprocket-chains 8 of these wheels 10 11 12 encompass, respectively, sprocket-wheels $G^3$ $G^4$ $G^5$ on the shaft D. The relative arrangement of the wheels of a gang in regard to the table is illustrated in Fig. 1$^a$.

The measuring mechanism above described constitutes that by which the register E is operated. A board ten feet in length will extend up to and beneath the wheel 3 and in passing beneath the wheels 1 2 3 will, if one inch thick, operate the wheel 1 and if two inches thick will operate the wheels 1 and 2; but the register will be under the control of the wheel 2, which causes the sprocket-wheel G' to operate more rapidly than wheel G, the inner section of which latter moves in unison with the sprocket-wheel G'. Likewise if the board is three inches thick it will operate all three wheels; but the register will register only the movement of the wheel 3, whose sprocket-wheel $G^2$ on the shaft D will revolve faster than the wheels G or G', the inner sections of which latter move with the wheel $G^2$. Adjacent to the wheel 12 is the main wheel 13 of the next gang of wheels, and this is the first wheel of the series employed to operate the shaft D', and through it the register E'. This wheel 13 rests upon the table A and is mounted between the parallel arms $f'$; but in lieu of passing its chain 8 directly to the sprocket-wheel $G^6$ on the register-shaft D' said chain encompasses a sprocket-wheel H, Fig. 3, mounted between arms $f'$, and upon the shaft of this wheel H is a smaller sprocket-wheel $i$, around which a chain 8' is passed, said latter chain being passed, also, over the sprocket-wheel $G^6$. This wheel 13 forms part of the gang used to measure boards two feet in length, and this requires an extra-large and an extra-small sprocket-wheel; hence the difference in construction and arrangement.

The other or remaining wheels (numbered from 14 to 24, inclusive) are constructed and arranged and suspended in place similarly to the corresponding wheels hereinbefore described, each wheel being connected with its own sprocket-wheel on the register-shaft D' like wheels 1 2 3 and 10 11 12.

To enable the invention to be more thoroughly understood by those skilled in the art to which it appertains, I will now set forth the relative dimensions of the various wheels for effecting the measurement of lumber.

As before stated, a board ten feet in length will pass from chain $a$ to and in under wheel 3 of gang F', while a board twenty feet long will reach under wheel 24.

The register-wheel $e$ is seventy-five (75) inches in circumference, the second wheel $e^5$ is twenty (20) inches in circumference, while the third wheel $e^9$ of the register is seventy-five (75) inches in circumference. The main wheel 1 is one hundred and twenty (120) inches in circumference, while its sprocket-wheel G is fifty (50) inches. Wheel 2 is sixty (60) inches, while the circumference of its sprocket-wheel G' is thirty (30) inches. Wheel 3 is fifty (50) inches and its sprocket-wheel $G^2$ twenty-five (25) inches; wheel 10, one hundred (100) inches and its sprocket-wheel $G^3$ fifty (50) inches. Wheel 11 is fifty inches and its sprocket-wheel $G^4$ twenty-five inches. Wheel 12 is thirty-three and one-third inches and its sprocket-wheel $G^5$ is twenty-five inches. The wheels following are connected with the register-shaft D', and their respective circumferences will be stated. That of wheel 13 is one hundred inches and its sprocket-wheel $G^6$ fifty inches; wheel 14, one hundred and twenty inches and its sprocket-wheel $G^7$ fifty inches; wheel 15, one hundred inches and its sprocket-wheel $G^8$ fifty inches; wheel 16, one hundred and fifty inches and its sprocket-wheel $G^9$ fifty inches; wheel 17, seventy-five inches and its sprocket-wheel $G^{10}$ fifty inches; wheel 18, fifty inches and its sprocket-wheel $G^{12}$ fifty inches; wheel 19, one hundred inches and its sprocket-wheel $G^{13}$ fifty inches; wheel 20, fifty inches and its sprocket-wheel $G^{14}$ fifty inches; wheel 21, sixty-six and two-thirds inches and its sprocket-wheel $G^{15}$ fifty inches; wheel 22, seventy-five inches and its sprocket-wheel $G^{16}$ fifty inches; wheel 23, seventy-five inches and its sprocket-wheel $G^{17}$ fifty inches; wheel 24, fifty inches and its sprocket-wheel twenty-five inches.

It will be understood, of course, that for machines of different capacities the circumference of the wheels, &c., will be changed, the same relative measurement, however, being uniformly observed. I have not stated the dimensions of the intermediate sprocket-wheels, since sufficient knowledge of the construction and arrangement of parts can be had from the foregoing. By employing two registers I am enabled to secure accurate measurements. A board twenty feet in length will register twelve feet on register E and eight feet on the register E', the combined registration being the length of the board. All boards of a shorter length than ten feet are cut on the trimmer, so that they are received on the measuring-table in such manner that the first two feet will come directly under wheel 13, as the gang of which said wheel is a part will measure boards one, two, and three inches thick and two feet in length. The remaining gangs are for the measurement of boards four, six, and eight feet, respectively.

The advantages of my invention are apparent, and it will be specially observed that by means thereof the exact number of square feet contained in boards can be readily and easily ascertained and that the operation is greatly facilitated by the introduction of the lumber sidewise into the machine.

I claim as my invention—

1. A lumber-measuring machine comprising a table over which the boards to be measured are fed sidewise, a series of measuring-wheels located in proximity to the top of said table at different altitudes and designed to revolve upon contact therewith of a board, and a register or registers having connection with said measuring-wheels, substantially as set forth.

2. A lumber-measuring machine comprising a table over which the boards to be measured are fed sidewise, a series of measuring-wheels of varying diameters or circumferences, located in proximity to the top of said table, a register or registers, a shaft or shafts for operating the same, and differential connections between said shaft or shafts and series of measuring-wheels, whereby one of said wheels can operate said shaft independent of the other wheels of the series, substantially as set forth.

3. A lumber-measuring machine comprising a table over which the boards to be measured are fed sidewise, a series of measuring-wheels of varying diameters or circumferences, located in proximity to the top of said table, means for automatically stopping or holding said wheels, a register, a shaft for operating the same, and differential connections between said shaft and series of measuring-wheels, whereby one of said wheels can operate said shaft independent of the other wheels of the series, substantially as set forth.

4. A lumber-measuring machine comprising a table over which the boards to be measured are fed sidewise, a series of measuring-wheels of varying diameters or circumferences, located in proximity to the top of said table at stated or relative distances apart, said series being divided into gangs of three wheels of different altitudes with relation to said table and to each other, a register for registering the square feet in a board passed over said table beneath or in contact with said wheels, and connections between said wheels and registers, whereby one wheel of each gang of the series can operate said register independent of the other wheels of said gang or of the entire series, substantially as set forth.

5. The herein-described improved lumber-measuring machine, comprising the table, the measuring-wheels located in proximity to the top thereof and arranged in gangs, each wheel of which is at a different height from said table, the sprocket-wheels on the axles of said measuring-wheels, the register, the operating-shaft therefor, the sprocket-wheels on said shaft, and the chains encompassing said latter sprocket-wheels, and also those aforementioned, substantially as set forth.

6. The herein-described improved lumber-measuring machine, comprising the table, a measuring-wheel or series thereof located in proximity to the top of said table and having a sprocket-wheel, the register, the operating-shaft therefor, the sprocket-wheel on said shaft, composed of inner and outer sections, said inner section being secured to said shaft and free to move in advance of said outer section, and the sprocket-chain encompassing said sprocket-wheels, substantially as set forth.

7. The herein-described improved lumber-measuring machine, comprising the table, a series of measuring-wheels located in proximity to the top thereof and at different altitudes, said wheels being of varying diameters and circumferences, sprocket-wheels designed to move with said measuring-wheels, the register, the operating-shaft therefor having sprocket-wheels thereon composed of inner and outer sections designed to engage with each other, said inner sections being secured to said shaft and free to move independent of the outer sections, and the sprocket-chains encompassing said sprocket-wheels, substantially as set forth.

8. In a lumber-measuring machine having a series of wheels of varying diameters or circumferences, a register, an operating-shaft therefor, sprocket-wheels on said shaft operated by each of said former wheels and composed each of an inner section secured to said shaft and having grooves or recesses in its periphery, and an outer section having weighted pawls for engagement with said grooves or recesses, substantially as set forth.

9. In a lumber-measuring machine, a series of measuring-wheels of varying diameters or circumferences having teeth in their peripheries and weighted pawls engaging with said teeth and having their lower weighted ends on a line with the contact-points of said wheels, substantially as set forth.

10. The herein-described improved lumber-measuring machine, comprising a frame, parallel arms extending therefrom, measuring-wheels located between said parallel arms and having teeth in their peripheries, and weighted pawls fulcrumed between said arms and engaging said teeth, substantially as set forth.

11. The herein-described improved lumber-measuring machine, comprising a frame having two upper joists or beams, parallel arms extending from said frame and composed of members adjustably connected together, measuring-wheels located between said parallel arms, and vertical rods depending from one of said joists or beams and having lower lateral arms supporting said parallel arms, substantially as set forth.

In testimony whereof I have signed this specification in the presence of two subscribing witnesses.

CLAUDE KIDDER.

Witnesses:
N. E. BARNARD,
M. E. OLDENBURG.